No. 790,976. PATENTED MAY 30, 1905.
C. C. PECK.
HEATING AND CIRCULATING WATER IN HOT WATER HEATING SYSTEMS.
APPLICATION FILED APR. 30, 1903.
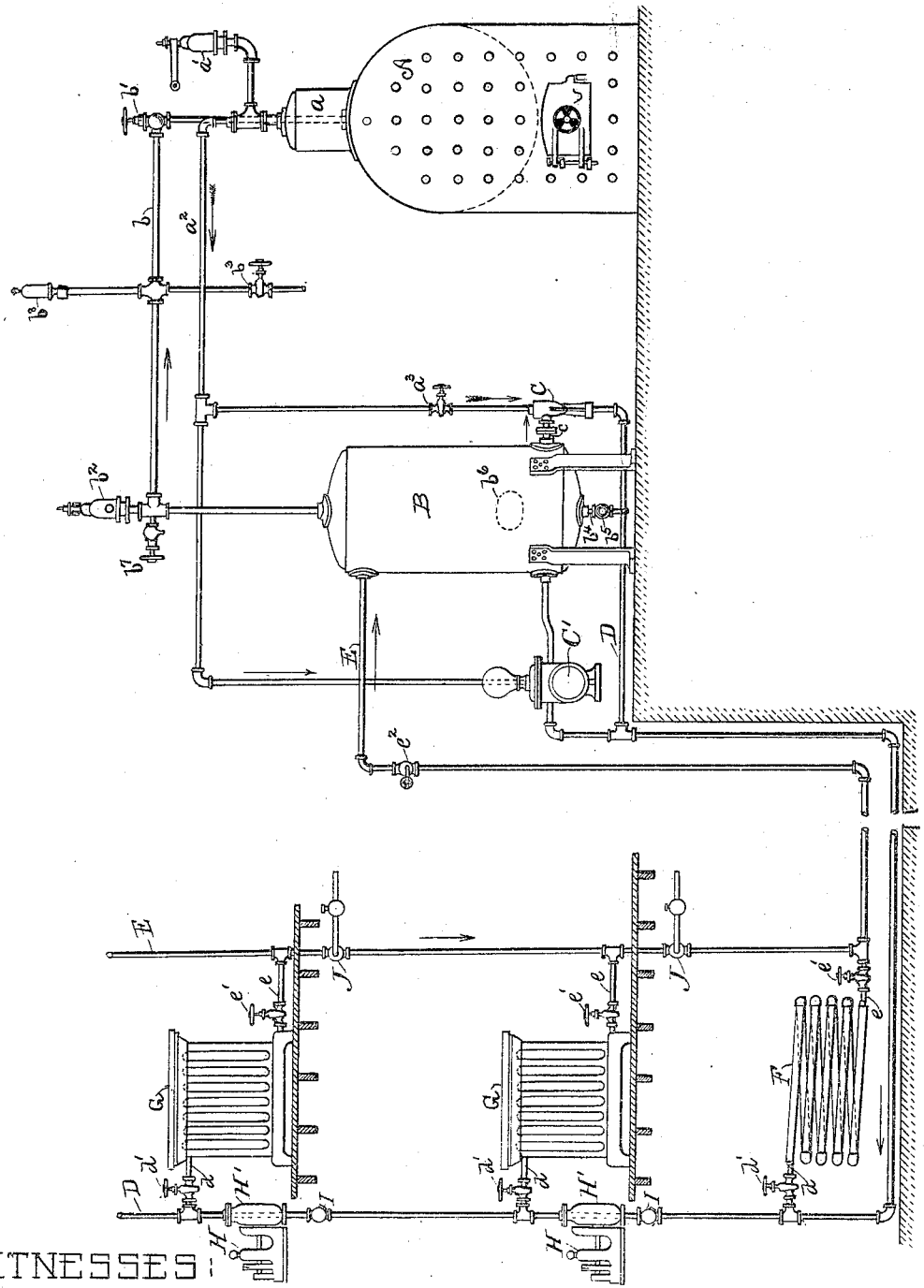
WITNESSES
L. D. Peck
Sumner Hayward
INVENTOR
Cassius Carroll Peck No. 790,976.

Patented May 30, 1905.

UNITED STATES PATENT OFFICE.

CASSIUS CARROLL PECK, OF ROCHESTER, NEW YORK.

HEATING AND CIRCULATING WATER IN HOT-WATER HEATING SYSTEMS.

SPECIFICATION forming part of Letters Patent No. 790,976, dated May 30, 1905.

Application filed April 30, 1903. Serial No. 155,076.

*To all whom it may concern:*

Be it known that I, CASSIUS CARROLL PECK, residing at Rochester, in the county of Monroe and State of New York, have invented certain new and useful Improvements in Heating and Circulating Water in Hot-Water Heating Systems, of which the following is a specification sufficient to enable others skilled in the art to which it appertains to make and use the same.

In the accompanying drawing like parts in the figure are designated by the same letters. Feathered arrows indicate direction of flow of steam, and unfeathered arrows indicate water-currents.

The figure is an elevation showing my invention, which includes the steam-boiler, hot-water receiver, with attached injector or steam-jet pump, and part of the radiators and piping.

In the drawing, A is a steam-boiler of locomotive type (but symbolizing any design of steam-boiler) having a dome $a$, with safety-valve $a'$. A steam-pipe $a^2$, provided with valve $a^3$, connects the steam-space of said boiler with injector or steam-jet pump C, which in turn is connected with hot-water receiver B by pipe $c$. Said receiver is completely filled with water of the heating system, as are also outflow-pipe D, coil F, radiators G, and return-pipe E. The latter has a back-pressure valve $e^2$. The coil and radiators are each provided with an admission-valve $d'$ in branch pipe $d$ and an exit-valve $e'$ in branch pipe $e$. Receiver B has a blow-off pipe $b^4$, with valve $b^5$, also a manhole or handhole $b^6$. A pipe $b$ connects the top of the receiver with either the steam-space or the water-space of boiler A, but preferably the steam-space, as shown by broken lines, which indicate that the pipe is connected to the top of boiler-shell behind the dome. Pipe $b$ has a branch with a valve $b^3$, also a relief-valve $b^2$.

Operation of the system is as follows: Boiler A being supplied with water and fired, so as to supply suitable steam-pressure, the heating system, consisting of receiver B, coil F, radiators G, with connecting-pipes from said receiver to radiators and from the latter to the receiver, can be filled with water from any source of supply by admission through valve $b^5$ and pipe $b^4$, valves $b'$, $b^3$, and $a^3$ being closed. The system may also be filled by injection of steam from boiler A through pipe $a^2$, valve $a^3$, and injector C and pipe D, the supply of steam being continued until the radiators, pipes, and receiver are filled with water of condensation. After the system is filled with water valve $b'$ is opened and steam as required is supplied to injector C through valve $a^3$. Said injector takes its supply of water from receiver B through pipe $c$ and forces the water through pipe D and branch pipes $d$ to coil F and radiators G, whence it returns through branch pipes $e$ and main return-pipe E to receiver B. Steam used through and condensed in injector C serves to heat the water-circuit, the injector thus filling the double office of forcing and heating the circulation. The rapidity of circulation through coil F and radiators G is controlled by opening and closing, more or less, valves $d'$ $e'$. Surplus water accumulating from condensation of steam is forced over from receiver B through pipe $b$ into boiler A, thus preserving a continuous supply of water for the boiler, as water of condensation returned to the boiler about equals the weight of steam withdrawn from the boiler and used through the injector.

In order to keep the heating system constantly filled with water, I employ a back-pressure valve $e^2$, conveniently located in return-pipe E, which valve is weighted to a little more than counterbalance the height of column of water on the radiator side of valve—that is, the height above pipe $b$. This prevents water from draining out of radiators on upper floors and discharging the water in excessive quantity into boiler A. Force of circulation created by injector C opens valve $e^2$ in exact proportion to the amount of circulation. After the return current of water enters receiver B the excess in amount caused by condensation of steam is forced over into boiler A through pipe $b$ and is evaporated for supplying steam to the injector. This system therefore combines certain elements both of a steam-heating system and of a hot-water heating system, having the advantages of both and the drawbacks of neither. As water enters injector C under pressure, it can be circulated at relatively high temperature—that is, it may enter the injector at about 180° Fahrenheit and be delivered into supply-pipe D at 212° or more, depending upon boiler-pressure and pressure maintained in circulating-pipes.

The figure shows also the provision which I make in case of high office and other buildings for carrying circulation in an uninterrupted current to upper floors which it would be inexpedient to attempt reaching by means of pump-pressure at the starting-point or at base of the column of water either because of loading forcing mechanism too heavily or on account of subjecting piping and radiators to unsafe pressure. At suitable height above the primary forcing mechanism, usually about half-way as to height of building, I connect into supply-pipe D a pump, as H, or an equivalent injector, which unites its lifting power to that of the primary pump C and relieves the latter of further load due to height of the column of water. Secondary pump H thus acts when in operation as a carrier of the weight of the column of water above it. To still further relieve the primary pump or injector, more than one secondary pump may be used in the case of very high buildings, so as to give easy lifting stages for the several pumps. Thus if two secondary pumps were used one could properly be set at from one-fourth to one-third the total height of the building and the other at three-fifths to two-thirds the total height. In connection with each secondary pump I insert a check-valve I in supply-pipe D, placing the valve a little below the pump, with the object of keeping the pump primed and to carry the superposed column of water when the pump is not in operation. According to convenience either electric current, as shown in case of motor H', steam, or gas may be employed for driving secondary pump H, the latter being of any design suitable for the service. In return-pipe E, I connect a back-pressure valve J at height nearly corresponding to secondary pump H, this valve being weighted to counterbalance the column of water above it, and thus relieve the portion of the heating system below it of the weight of said water, as well as to keep the pipe and radiator system above it filled with water. There should be one of these back-pressure valves J for each secondary pump H, and there can be no objection to using more of such valves than pumps. The minimum number of valves would be one for each thirty feet of height. In a central-station system of heating it is desirable that secondary pumps H and back-pressure valves J should be set at nearly uniform heights in various buildings served by the system and also set low, so as to relieve the primary or station pump of lifting load.

The height of the highest secondary pump will determine the amount of pressure to be carried on station back-pressure valve $e^2$.

The system of heating by means of water circulation forced and heated by one or more injectors or steam-jet pumps the action of which returns automatically to the heating boiler or boilers all surplus water as fast as it accumulates in the heating-circuit is adapted for use either in central-station heating or for heating individual buildings. While for simplicity and clearness I have shown but one injector, I do not confine myself to the use of a single injector on a heating-circuit, as often more than one will be needed either for forcing or heating the water of a circuit or for both requirements, and the use of a plurality of injectors in no wise changes the conditions of my invention.

Having described my invention, what I claim, and desire to secure by Letters Patent, is—

1. In a hot-water heating system the combination, with a closed heating-circuit filled with water and consisting of pipes and radiators and a closed storage-tank at the bottom of the circuit, of a boiler, means for continuously and mechanically circulating heated water in said circuit, and a separate open pipe connection from the upper part of the storage-tank to the boiler, substantially as described.

2. In a hot-water heating system the combination, with a closed heating-circuit filled with water and consisting of pipes and radiators and a closed storage-tank at the bottom of the circuit, of a steam-boiler, a connection from said boiler to the circuit for circulating and heating water therein, and a separate open pipe connection from the upper part of said storage-tank to the boiler, substantially as described.

3. In a hot-water heating system the combination, with a closed heating-circuit filled with water and consisting of pipes and radiators and a closed storage-tank at the bottom of the circuit, of a steam-boiler, an injector in said circuit, a connection from the boiler for operating the injector, and a separate open pipe connection from the upper part of the storage-tank to the boiler, substantially as described.

4. In a hot-water system, the combination of a water-circuit, means of producing the circulation of water therethrough, a back-pressure valve located in the return-pipe of said circuit, said valve being weighted to counterbalance a column of water above said valve in said return in order to maintain said return-pipe full of water, substantially as set forth.

5. In a hot-water heating system, the combination of a water-circuit, means of producing the circulation of water therethrough, a plurality of back-pressure valves located in the return-pipe of said circuit, each of said valves being weighted to counterbalance a column of water above each valve in said return for the purpose of maintaining said return-pipe full of water, substantially as shown and described.

6. In a hot-water system, the combination of a water-circuit, and a primary pump for effecting circulation of water through the circuit, with a secondary pump connected into the circuit and located above the primary pump, and with a check-valve placed in the heating-circuit a little below the secondary pump, essentially as shown and described, and for the purpose specified.

7. In a hot-water system, the combination of a water-circuit, and a primary pump for producing circulation of water through the circuit, with a plurality of secondary pumps connected into the circuit, and located above the primary pump, each secondary pump having a check-valve placed in the heating-circuit a little below the pump, substantially as, and for the purpose, specified.

8. In a hot-water system, the combination of a water-circuit, means for circulating water therethrough, and an automatic valve in the return-pipe of said circuit for counterbalancing a predetermined column of water above it, substantially as described.

CASSIUS CARROLL PECK.

Witnesses:
JNO. H. McANARNEY,
SAML. B. SWALES.